United States Patent [19]

Peterson

[11] Patent Number: 4,606,179

[45] Date of Patent: Aug. 19, 1986

[54] APPARATUS TO IMPROVE THE OPERATION OF A CONTINUOUSLY MOVING HARVESTER FOR TREE CROPS

[75] Inventor: Donald L. Peterson, Martinsburg, W. Va.

[73] Assignee: The United States of America as represented by the Secretary of Agriculture, Washington, D.C.

[21] Appl. No.: 732,320

[22] Filed: May 9, 1985

[51] Int. Cl.[4] .............................................. A01D 46/24
[52] U.S. Cl. ................................. 56/329; 56/328 TS
[58] Field of Search ................... 56/328 TS, 329, 330

[56] References Cited

U.S. PATENT DOCUMENTS

| | | | |
|---|---|---|---|
| 3,553,949 | 1/1972 | Rauth | 56/329 |
| 3,635,004 | 1/1982 | Webb et al. | 56/328 TS |
| 4,160,357 | 7/1979 | Peterson et al. | 56/329 |
| 4,194,347 | 3/1980 | Peters | 56/329 |

FOREIGN PATENT DOCUMENTS

0200846  6/1983  Fed. Rep. of Germany ........ 56/329

Primary Examiner—Gene Mancene
Assistant Examiner—David I. Tarnoff
Attorney, Agent, or Firm—M. Howard Silverstein; David G. McConnell

[57] ABSTRACT

An apparatus is provided that retracts the shaking mechanism of a shake-catch harvester without damaging a tree. The apparatus also provides a mechanism for preventing the shaker from sliding backwards when the harvester is going uphill, a sealing mechanism for the catching surface of the harvester, and an energy absorbing catching surface to minimize fruit damage.

11 Claims, 12 Drawing Figures

APPARATUS TO IMPROVE THE OPERATION OF A CONTINUOUSLY MOVING HARVESTER FOR TREE CROPS

BACKGROUND OF THE INVENTION

1. Field of The Invention

This invention relates to a continuously moving harvester for tree crops. More specifically, this invention relates to an automatically sequencing trunk shaker on the harvester and to apparatus for preventing damage to a tree by a trunk shaker when the shaker is withdrawn from the tree. The invention also relates to a tree trunk seal and catching surface for the fruit or other product catching surface.

2. Description of the Art

Currently available continuously moving tree crop harvesters do not have adequate means to prevent damage to the trees by the trunk shaker mechanisms. They also lack adequate means for sealing the catching surface around the tree trunk. In addition, fruit is often damaged when it drops onto the catching surface of operating harvesters.

A number of over-the-row and other types of shake-catch harvesters have been described in Transactions of The ASAE 17, 623–626, 1974; 20, 202–205 and 209, 1977; 25, 1478–1483, 1982; and in U.S. Pat. Nos. 3,635,004 and 4,160,357.

SUMMARY OF THE INVENTION

An object of this invention is to provide an apparatus that prevents damage to a tree when the shaker jaws are released or unclamped from the tree trunk.

Another object is to provide a device that prevents the shaker mechanism from being out of position for proper sequencing.

Still another object of this invention is to provide the fruit catching surface of a continuously moving tree harvester with a tight but flexible seal around the trunk of a tree to prevent fruit loss.

A further object is to provide a seal having an unobstructed opening so that the tree may be positioned in the catching surface properly during the sealing operation.

A still further object of this invention is to provide an apparatus which allows the catching surfaces to be removed from the tree trunk without causing damage to the tree.

Still another further object of this invention is to provide a catching surface that can absorb the energy of falling fruit and reduce the damage of that fruit.

According to this invention the above objects are accomplished by an apparatus comprising a main track system on which a shaker mechanism having a bearing plate operates. The position of the bearing plate in relation to the shaker is determined by a release rod which is attached to both the bearing plate and to a movable member of the shaker mechanism. An angle iron pivotally attached to the main track system is provided with tabs which, when the shaker mechanism is about to be retracted from contact with a tree, engages a connecting plate pivotally attached to the bearing plate thereby providing means to force the stationary shaking member away from the tree trunk so that the shaker can be retracted without damaging the tree.

The objects are also accomplished by an apparatus pivotally connected to the main track so that it butts against a plate connected to the shaker mechanism to prevent the shaker from sliding rearwards when the harvester is going uphill.

The objects are further accomplished by a seal on the catching surface of the harvester which is attached to a rod provided with guiding means and which operates through a hydraulic cylinder that is sequenced to operate in parallel with a cylinder that operates the jaws of the shaker mechanism.

The objects are still further accomplished by a catching surface that is not rigidly supported but spring-tensioned to a slide bearing operating in a track attached to the main harvester frame.

DESCRIPTION OF THE INVENTION

On a continuously moving shake-catch harvester as described in the art, the trunk shaker is suspended from a framework that is bearing supported and is free to slide on a main track. This arrangement permits the shaker when positioned on a tree trunk to stay on the trunk while the rest of the harvester is moving continuously along a tree row as described in the art cited above. This free movement in the track presented two problems. The first problem occurred when the harvester was headed down an incline and the shaker jaws were unclamped from the tree trunk. At this point in the operation the shaker was ready to be retracted from the shaking position. However, the weight of the shaker put a forward force on the shaker suspension frame which could not move because the stationary or rear shaker jaw was pressing against the tree trunk. When the shaker was withdrawn from the trunk, the force with which the stationary jaw was pressing against the tree caused damage to the trunk, especially on young trees or trees whose bark failed easily.

In order to correct this problem and prevent damage to the trees, a special apparatus or device was developed to allow the unclamping front shaker jaw to be held stationary with respect to the track while the body of the shaker and the rear jaw is pushed backwards thereby displacing it away from the tree trunk. The shaker is then held in this position long enough to allow the shaker to be displaced laterally away from the tree before the forward travel of the harvester enables the stationary shaker jaw to again contact the tree. When the shaker is completely retracted from the tree it is free to move along the track and assume its initial position.

The apparatus which solved the problem and prevents the shaker from damaging the trees is comprised of a trunk release track parallel to and slightly offset below the main track and connected to the shaker suspension frame, a bearing plate which operates in the trunk release track, a release rod connected to both the bearing plate and the movable shaker jaw, a connecting plate pinned to the bearing plate and held in position perpendicular to the trunk release track by a spring, an angle iron provided with tabs and counter weights and a hydraulic cylinder and piston for clamping and unclamping the shaker jaws.

More specifically, a trunk release track is connected to the shaker suspension frame by two steel tubular spacers that are attached to both the trunk release track and the shaker suspension frame. The trunk release track is parallel to and slightly offset below the main track. Operating in the trunk release track is a bearing plate that is guided by two slide bearings. The bearing plate is positioned by a release rod, one end of which is attached to the frame of the movable shaker jaw, and the other end is attached to the bearing plate. Since the movable shaker jaw can be moved in a horizontal plane, a notch is cut in the bearing plate to allow free movement of the release rod. Also, pinned to the bearing plate is a connecting plate that is held in position perpendicular to the trunk release track by a spring. The connecting plate can be rotated clockwise about the connecting pin. Equally spaced and attached to the back of the main track are three spacing support tubes each of which has attached to it a mounting tab. Pinned to each mounting tab is a connecting bar, one end of which is attached to an angle iron which runs the full length of the main track. The full length of the underside of the angle iron is provided with equally spaced stationary tabs. A counter weight is attached to the other end of each connecting bar. The counter weights position the upper leg of the angle iron in contact with the bottom side of the main track. This can also be accomplished by connecting springs to the angle iron and to the back side of the main track.

The apparatus operates in the following manner, When the shaker is positioned around the tree trunk and the movable shaker jaw is clamped to the trunk, the bearing plate slides along the trunk release track towards the rear of the shaker as the harvester continues to move along a tree row. Since the position of the stationary tabs connected to the angle iron is fixed, the connecting plate pivots to slide by the tabs and is spring returned to its initial position in the spacing between the tabs. As shaking occurs, the shaker slides along the main track. The connecting plate continues to slide by the tabs. When shaking is complete, the action of the movable jaw is reversed to unclamp the shaker from the tree. This puts a tension force on the release rod which then exerts a forward pulling force on the bearing plate. However, the connecting plate engages a stationary tab which prevents this action. As a result, the bearing plate, release rod and movable shaker jaw positions are held fixed with respect to the main track. Since the piston of the hydraulic cylinder continues to extend, the main body of the shaker, stationary shaker jaw and shaker suspension frame are displaced toward the rear of the track. Since the speed of unclamping, that is, the speed at which the cylinder extends the piston, is faster than the forward ground speed of the harvester, the stationary shaker jaw is moved away from the tree trunk. As soon as unclamping is complete, the shaker and suspension system is retracted from the tree at a rate fast enough to prevent the forward ground speed of the harvester from allowing the stationary shaker jaw to again contact the tree trunk. The position of the shaker is held fixed until the retraction is nearly complete and then a tilt lever that is connected to the main frame of the harvester engages a tilt bracket connected to the angle iron. This action causes the angle iron with stationary tab mechanism to be rotated counter clockwise about the pivot point and frees the connecting plate from contact with the tabs. At this point, the shaker is moved forward by a cable and drum system to its initial position ready for the next shaker sequencing operation. At the start of the next sequencing operation, the angle iron is again positioned so that the whole operation can be repeated. The tilt lever can be rigidly attached to the main frame of the harvester or other suitable arrangements may be used. The only requirement is that it be in position to engage the tilt bracket when the shaker mechanism has been retracted from a tree.

The second problem of free movement of the shaker suspension frame along the track occurs when the shaker and track are retracted from the tree and the harvester is heading uphill. The shaker then can freely slide towards the rear of the track because of gravity. This is undesirable since it takes the shaker out of its initial position for proper sequencing and causes the automatically sequencing circuit to repeatedly pull the shaker back to its initial position. A device was designed to prevent the shaker from sliding towards the rear. A vertical rod is welded or otherwise attached to the back side of the main track and extended above the top of the main track. A bar with a hole drilled in it is positioned over the rod. One end of the bar is attached to a tension spring which in turn is attached to a main track support member. The maximum clockwise position, as seen in a top view, is controlled by a stop welded to the main track. In the initial retracted position of the track, the front edge of the bar butts against the switching plate which is welded to the shaker suspension frame. In this position, rearward movement of the shaker is prevented. A cable whose other end is fastened to the main frame of the harvester is connected to the bar near its front end. When the track is completely shifted to position a tree in the shaker jaws, the cable tightens and moves the bar counterclockwise to disengage it from the switching plate. This action allows the shaker to slide along the track for proper sequencing. When the shaker is retracted from the tree, the cable slackens and the spring returns the bar to its initial position. As a cable and drum arrangement pulls the shaker back to its initial position the switching plate slides by the lever, and when cleared, the lever regains its initial position blocking the travel of the shaker.

In general, the catching surfaces on commercial stop-go harvesters use a flexible member with a slit in it to accommodate a tree trunk and form a seal. However, the flexible member is often bent in such a way as to become a barrier to fruit movement or a cause of fruit loss to the ground. In U.S. Pat. No. 4,160,357, a rotating trunk seal mechanism for use on a continuously moving tree-crop harvester is described but this was found to have reliability problems in that it did not completely seal around a tree trunk. The catching surfaces on commercial shake-catch harvesters are generally rigid or semi-rigid surfaces covered with foams of varying thickness and energy absorbing capacities. These types of surfaces can cause fruit rebound and increase damage.

The seal is an integral part of an incline padded catching surface for shake-catch harvesters and must operate effectively for maximum efficiency. On our shake-catch harvester the incline catching surface consists of a tubular steel frame whose side members that may come in contact with the tree trunk are covered by a four to six inch wide foam buffer that acts as part of a catching surface and provides a safety edge in positioning the catching surface under a tree canopy. The tubular steel frame is attached to and supported by the shaker suspension frame. The catching surface consists of a neoprene-on-nylon sheet that is covered with foam. The foam can also be covered by a protective sheet to prevent damage by tree limbs The lower side of the catching surface has a pocket sewn to it that slips over the tubular steel frame and foam buffers to provide support for the catching surface A teflon coated belting material that overlaps the foam edges of the catching surface that may contact a tree is sewn or otherwise attached perpendicular to the plane of the sheet forming one side of the pocket. This provides a low friction surface for a tree trunk to slide against if contact is made. The upper edge of the catching surface is spring connected to a slider bearing that is supported by a track attached to the main harvester frame. When the shaker is retracted from the tree the catching surface is slack. However, when the shaker is extended to clamp onto a tree the catching surface is pulled taut. As the shaker suspension frame slides in the main track, the slide bearing moves in its track to maintain the catching surface with respect to the tree. The spring tensioned catching surface is an excellent energy absorber and reduces fruit rebound and damage. At the opening provided in the catching surface to accommodate a tree trunk the neoprene-on-nylon material also forms a flexible, movable flap over the area into which a tree trunk is positioned during the shaking operation. Each side of the opening including the edge of the flexible flap is provided with a foam edge covered with the teflon coated belting material. The inside edge of the flexible flap is attached to an elastic band and the inside end of the elastic band is attached to the tubular steel frame. The outside end of this band is fastened to an end block which is secured to a steel rod. The rod is sequenced by a hydraulic cylinder and is prevented from rotating by a guide block that is an integral part of the support frame. In the open position the flap and rod are in such a position as to allow the tree trunk to be freely positioned within the catching surface framework. At this point in harvesting, the jaws of a trunk shaker, positioned under the catching surface, are clamped firmly onto the tree trunk by actuation of a hydraulic cylinder. By plumbing the sequencing cylinder in parallel with the clamping cylinder, the steel rod is translated to the closed position and positions the flap to form a seal around the tree trunk and an effective catching surface. The foam along the edge of the opening opposite the flexible flap deforms to allow space for the trunk. The outer end of the elastic band attached to the flap is bolted to the top surface of the end block that is securely fastened to the steel rod. The end block is rigidly attached to the steel rod by a bolt through the center of the block and the rod. The elastic band attached to the flap allows a flexible but effective seal to be made around the tree trunk. The edges along the tree trunk can have a raised foam edge or other material attached to them that prevents fruit from running down the catching surface and into the slight opening that does exist. The steel rod has a keyway cut along its length that prevents its rotation when operating in the guide block. This prevents the end block from rotating and causing the flap to become slack. The steel rod is threaded onto the cylinder rod. The cylinder is attached to a frame member. When shaking is complete and the fruit has drained off the catching surface the shaker clamp circuit is energized to unclamp the shaker jaw from the tree trunk. Since the sequencing cylinder is in parallel with this clamp cylinder, the rod and end block are also sequenced to bring them to their initial open position. This allows the catching surfaces to be removed from the tree trunk without causing damage.

Figure 1:
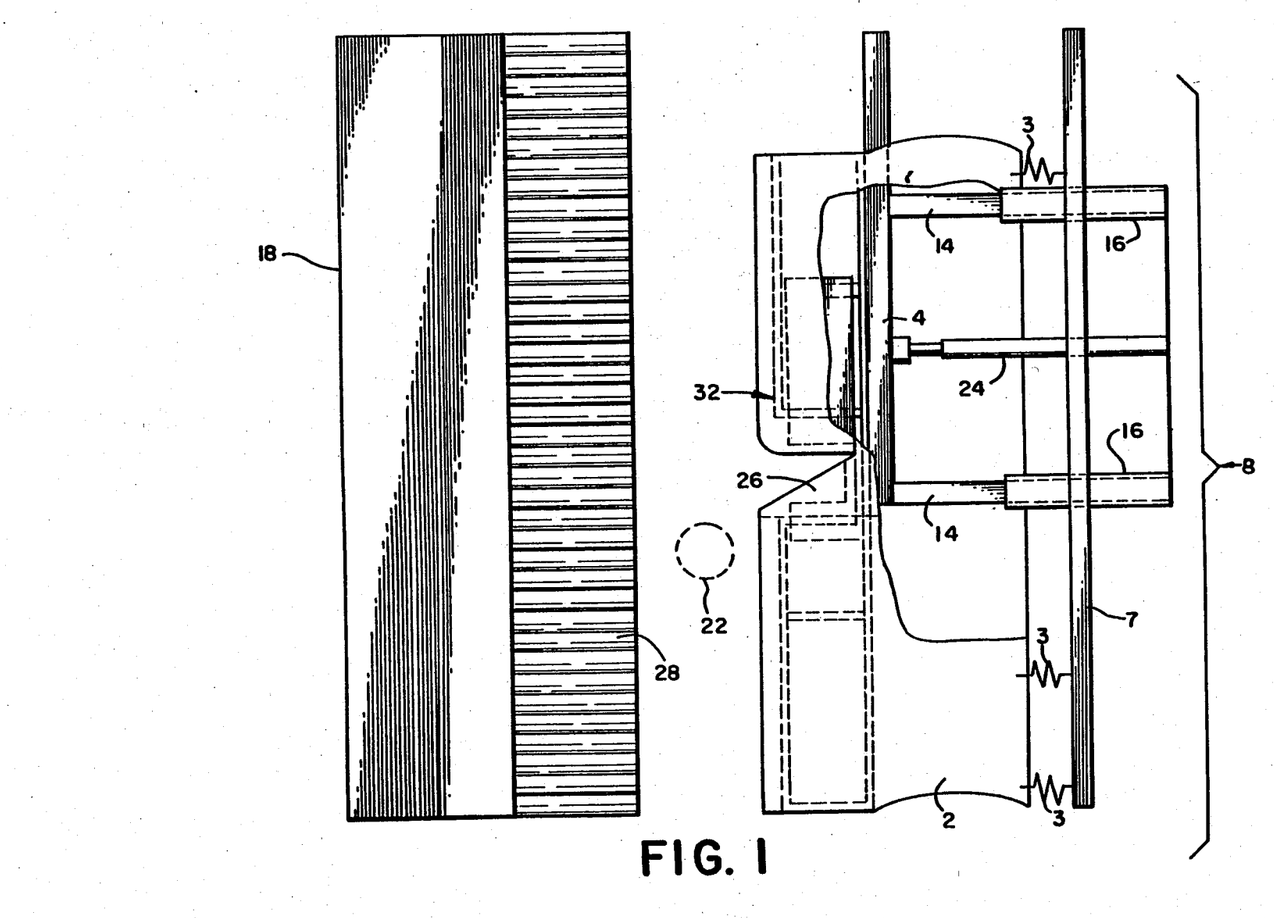
FIG. 1 is a top view of the catching surface and seal.
Figure 2:
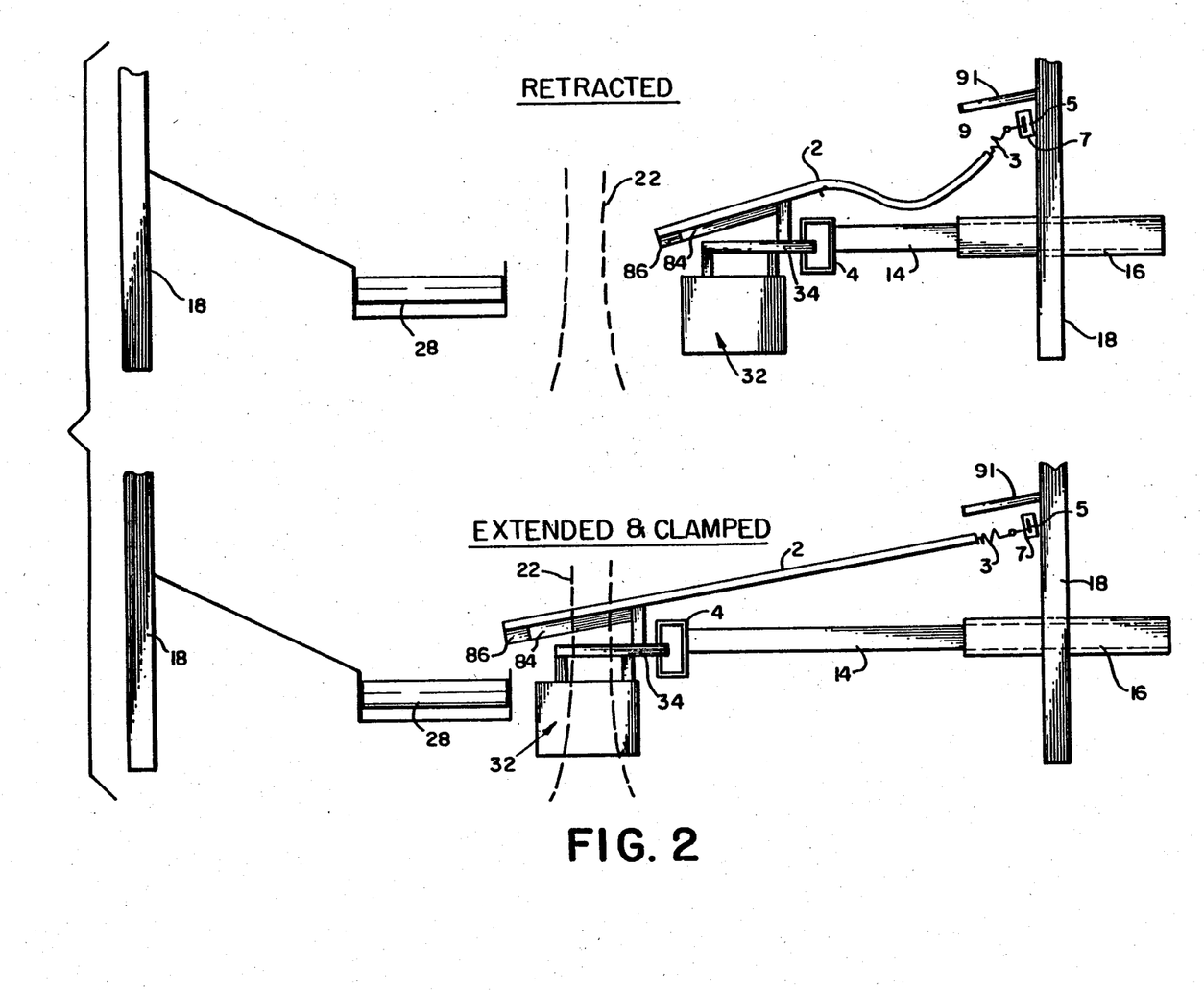
FIG. 2 is a front view of the catching surface in both the retracted and operating position.
Figure 3:
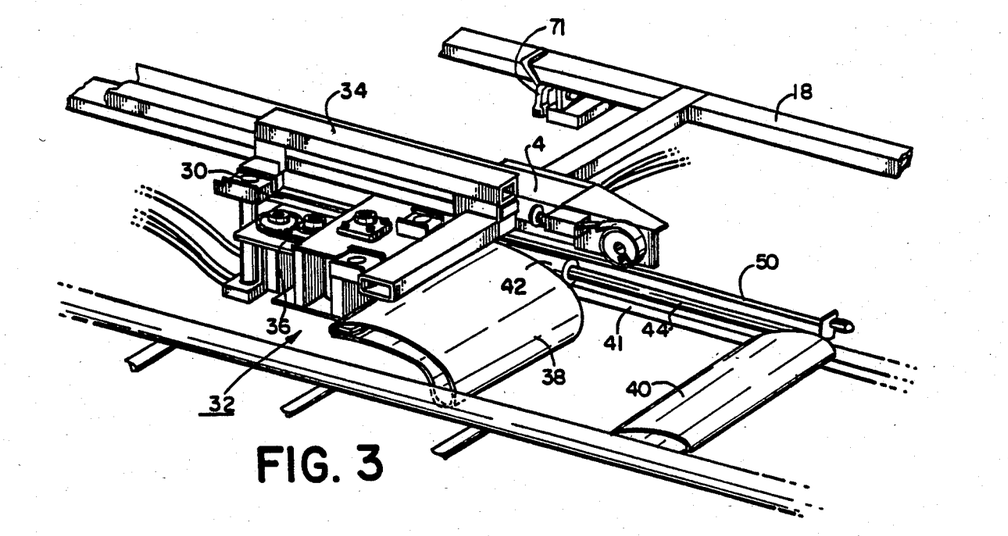
FIG. 3 shows the shaker mechanism and shaker jaws in relation to the main track.

With reference to the figures, the main or shaker suspension frame and the catching surfaces of continuously moving shake-catch harvester are shown in FIGS. 1 and 2. On the lower or tree side, right catching surface 2 is supported by and affixed to shaker suspension frame 34, and on the upper side it is supported by elastic bands 3 connected by eyebolt 9 to slide bearing 5 which is slidably supported inside track 7. Track 7 is connected to main harvester frame 18. Track 7 is essentially rectangular tubing with a slit cut out on one side to accommodate eyebolt 9 so that bearing 5 can slide inside track 7 when the shaker is operating. The track system is a means of allowing right catching surface 2 to slide backward and forward in relation to the forward motion of the harvester 8. Shaker suspension frame 34 is bearing supported and operates in main track 4. Main track 4 is rigidly connected to two horizontal members 14. These two horizontal members 14 are supported by and capable of sliding through two support housings 16 which are rigidly fastened to the main frame 18 of the right half of harvester 8. As harvester 8 approaches a tree 22, a switch is triggered and hydraulic cylinder 24 is energized to move catching surface 2 and trunk seal 26 along with it out and around trunk of tree 22 so that seal 26 surrounds trunk 22. Fruit caught on surface 2 is transferred off right catching surface 2 onto conveyor 28. As harvester 8 continues to move forward, seal 26 and surface 2 stay in position around tree trunk 22 by having shaker suspension frame 34 and slider bearing 5 pulled through and along main track 4 and track 7, respectively. When shaking is completed surface 2 with seal 26 are retracted to their original position. As shown in figure 3, trunk release track 30 is part of shaker mechanism 32 comprising a shaker suspension frame 34, shaker motor 36, rear or stationary shaker jaw 38, front or movable shaker jaw 40, hydraulic cylinder 42 and piston rod 44. Shaker 32 is underneath catching surface 2. Shaker suspension frame 34 operates on bearings in track 4. Trunk release track 30 is parallel to and slightly offset below track 4. Operating in track 30 is bearing plate 46 which is guided by slide bearings 48, FIG. 4. Plate 46 is positioned by release rod 50, the other end of which is attached to the frame of movable shaker jaw 40. A notch 52 cut in bearing plate 46 allows rod 50 to move in a horizontal plane. Connecting plate 54 is connected to plate 46 by pin 56 and is held in position perpendicular to track 30 by spring 58. Plate 54 can be rotated clockwise about pin 56. Equally spaced and attached to the back of track 4 are three spacing support tubes (not shown), each of which has attached to it a mounting tab 60. Pinned to each mounting tab 60 is a connecting bar 62, one end of which is attached to angle iron 64 and the other end to a counter-weight 66. Angle iron 64 runs the full length of track 4. The underside of angle iron 64 is provided with equally spaced stationary tabs 68. Angle iron 64 is also provided with tilt bracket 70 which contacts tilt lever 71 (FIG. 3) attached to the frame of harvester 8 when shaker mechanism 32 is retracted from a tree. Contact of bracket 70 with tilt lever 71 pivots angle iron 64 so that tabs 68 are not in position to engage connecting plate 54. When shaker 32 moves outward to be in shaking position, tilt bracket 70 is no longer in contact with tilt lever 71 and counter weights 66 pivot angle iron 64 so that tabs 68 are in position to engage connecting plate 54.

Figure 4:
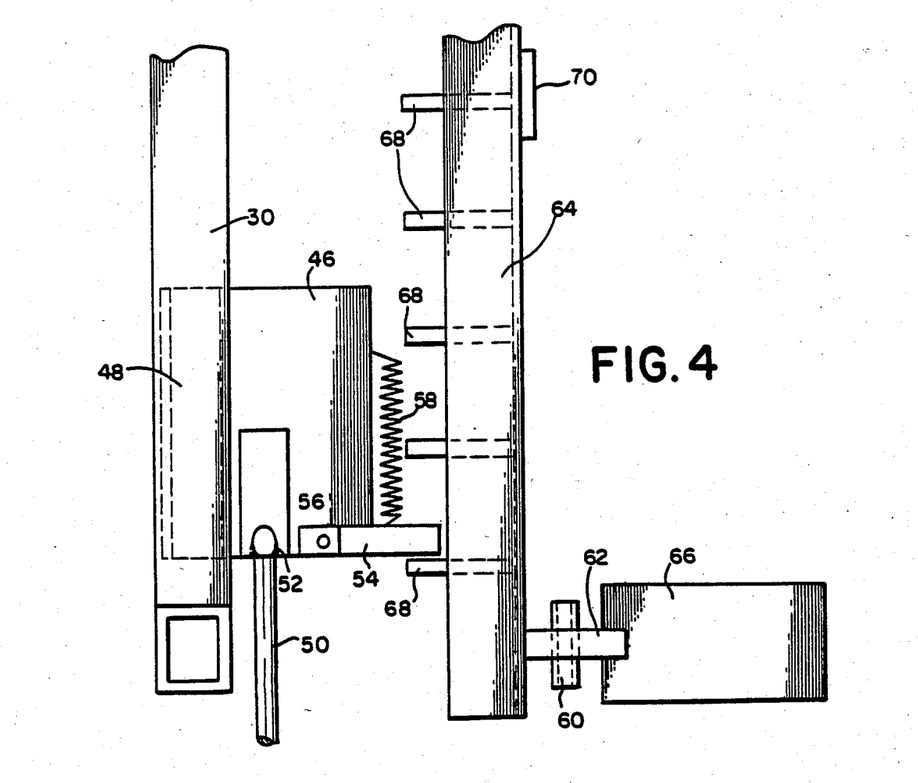
FIG. 4 is a top view of a schematic of the apparatus for retracting the shaker.

The apparatus operates in the following manner, When the shaker is positioned around tree trunk 22 and movable shaker jaw 40 is clamped to the trunk, bearing plate 46 slides along the trunk release track 30 towards the rear of the shaker as harvester 8 continues to move along a tree row. Since the position of stationary tabs 68 connected to angle iron 64 is fixed, connecting plate 54 pivots to slide by tabs 68 and is spring returned to its initial position in the spacing between the tabs. As shaking occurs, the shaker slides along main track 4 and connecting plate 54 continues to slide by the tabs 68. When shaking is complete, the action of the movable jaw 40 is reversed to unclamp the shaker from trunk 22. Movable jaw 40 slides on rod or track 41 which is attached to shaker frame 34. This puts a tension force on release rod 50 which then exerts a forward pulling force on bearing plate 46. However, connecting plate 54 engages a stationary tab 68 which prevents this action. As a result, the positions of bearing plate 46, release rod 50 and movable shaker jaw 40 are held fixed with respect to main tract 4. Cylinder 42 and piston 44 are attached to shaker frame 34 and jaw 40, respectively, so that piston 44 of hydraulic cylinder 42 continues to extend, the main body of the shaker, stationary shaker jaw 38 and shaker suspension frame 34 are displaced toward the rear of the track. Since the speed of unclamping, that is, the speed at which cylinder 42 extends piston rod 44 is faster than the forward ground speed of harvester 8, stationary shaker jaw 38 is moved away from tree trunk 22. As soon as unclamping is complete, the shaker and suspension system is retracted from the tree at a rate fast enough to prevent the forward ground speed of the harvester from allowing stationary shaker jaw 38 to again contact tree trunk 22. The position of the shaker is held fixed until the retraction is nearly complete and then tilt lever 71 that is connected to the main frame of the harvester engages tilt bracket 70 connected to angle iron 64. This action causes angle iron 64 with stationary tab mechanism to be rotated counter clockwise about its pivot point, tab 60, and frees connecting plate 54 from contact with the tabs 68. At this point, the shaker is moved forward by a cable and drum system to its initial position ready for the next shaker sequencing operation.

Figure 5:
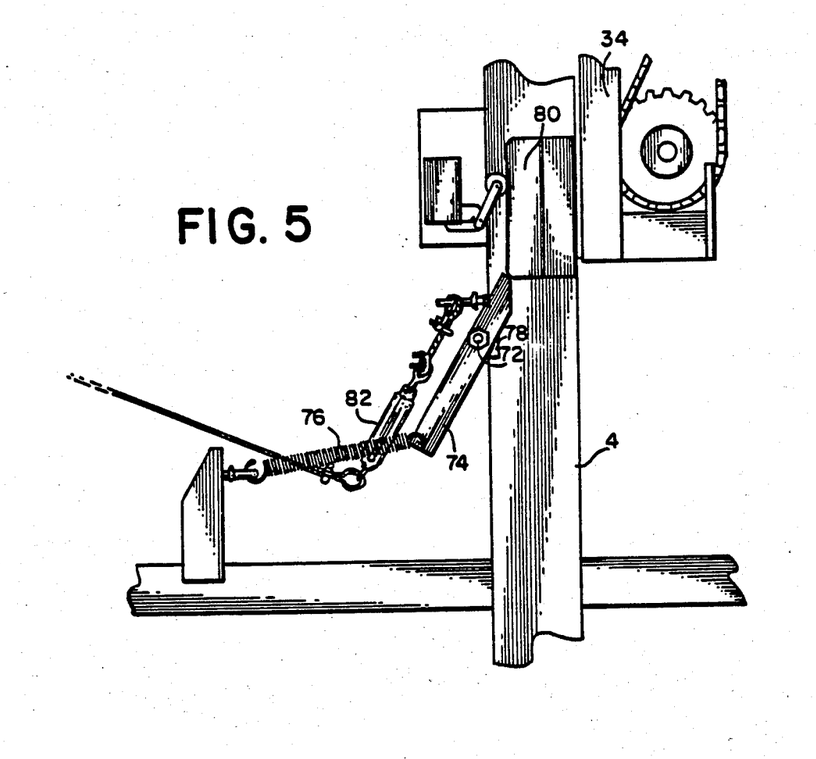
FIGS. 5 and 6 are top views of the apparatus for preventing the shaker from sliding backwards.
Figure 6:
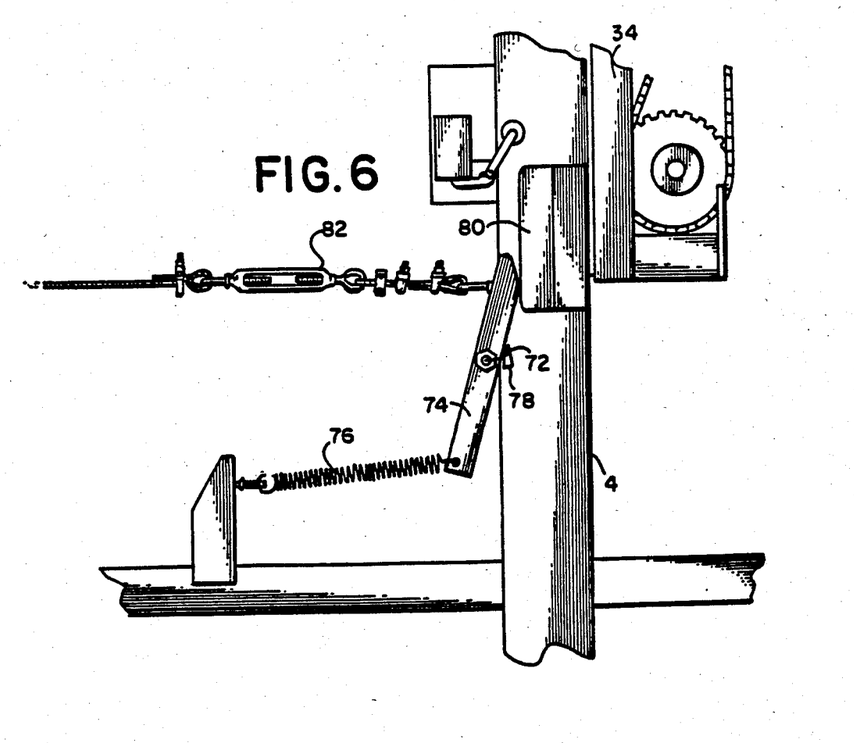

With regard to the second problem, as noted above, a device, as shown in FIGS. 5 and 6, was designed to prevent the shaker from sliding towards the rear. Vertical rod 72 is welded or otherwise attached to the back side of main track 4 and extended above the top of the main track. Bar 74 with a hole drilled in it is positioned over rod 72. One end of bar 74 is attached to tension spring 76 which in turn is attached to a main track support member. The maximum clockwise position, as seen in a top view, is controlled by stop 78 welded to main track 4. In the initial retracted position of the track, FIG. 5, the front edge of bar 74 butts against switching plate 80 which is welded to and moves with shaker suspension frame 34 (not shown in FIGS. 5. and 6). In this position, rearward movement of the shaker is prevented. Cable 82 whose other end is fastened to the main frame of the harvester is connected to bar 74 near its front end. When the track is completely shifted to position a tree in the shaker jaws, cable 82 tightens and moves bar 74 counterclockwise to disengage it from switching plate 80. This action allows the shaker to slide along the track for proper sequencing. When the shaker is retracted from the tree, cable 82 slackens and spring 76 returns bar 74 to its initial position. As a cable and drum arrangement pulls the shaker back to its initial position the switching plate slides by the lever, and when cleared, the lever regains its initial position blocking the rearward travel of the shaker.

Figure 7:
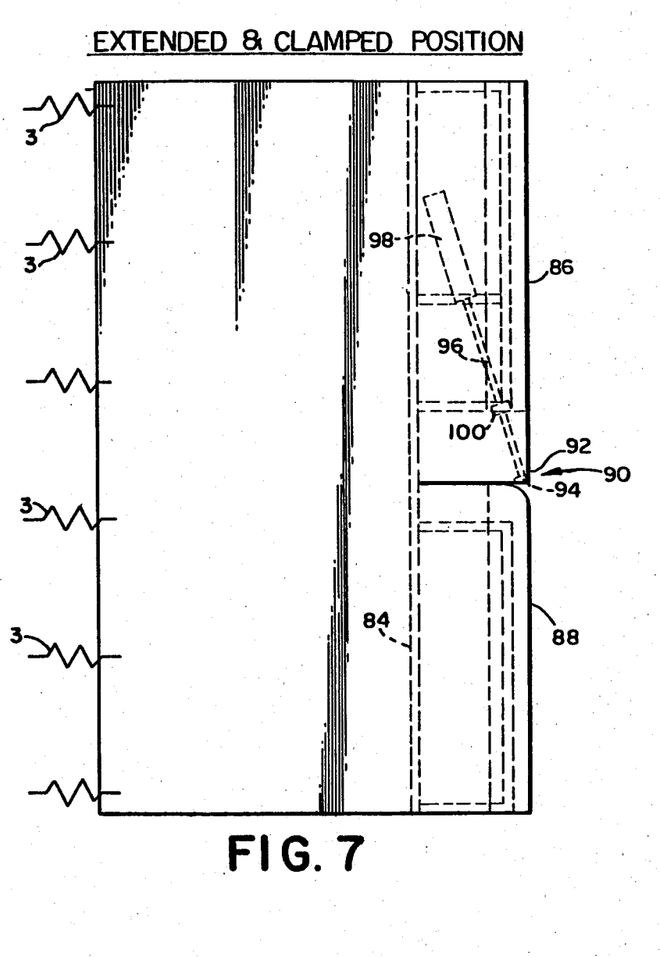
FIGS. 7 and 8 are schematics of the catching surface and the seal.
Figure 8:
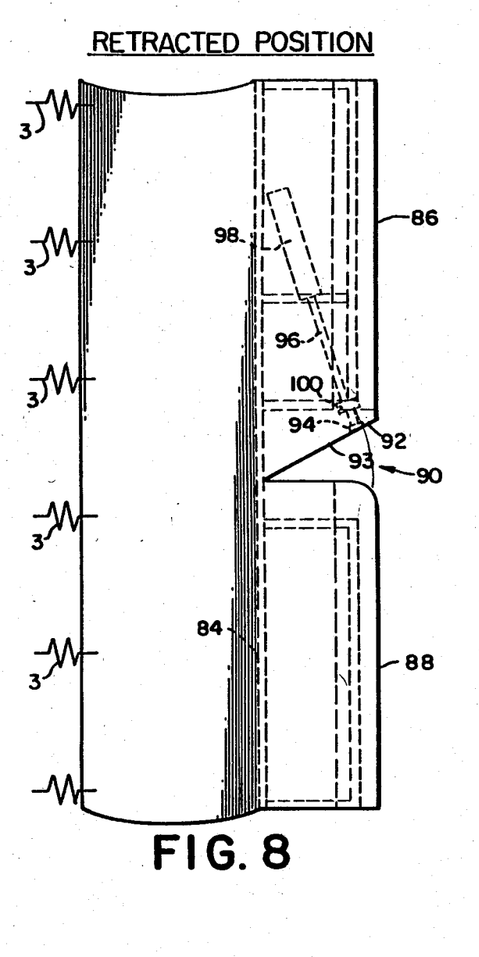
Figure 9:
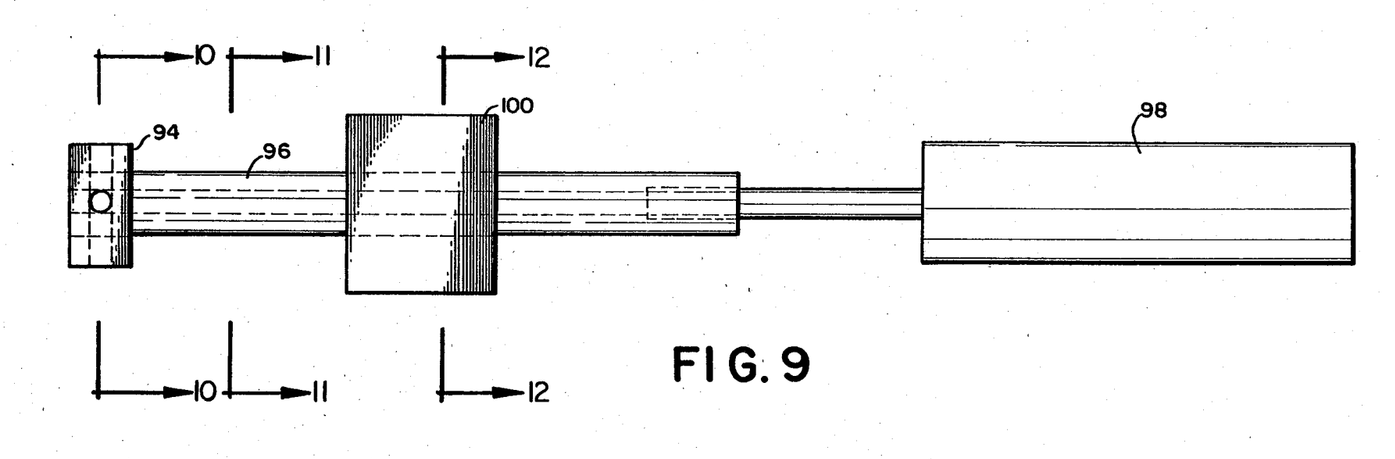
FIG. 9 is a schematic of the seal closure rod, guiding means and operating cylinder.
Figure 10:
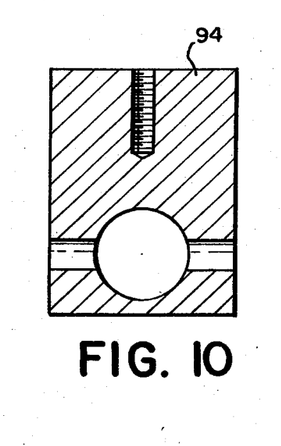
FIGS. 10 through 12 are sectional views along lines 10—10, 11—11 and 12—12 of FIG. 9.
Figure 11:
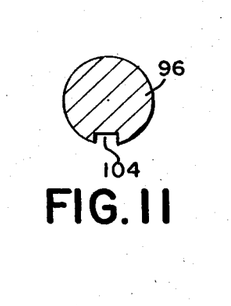
Figure 12:
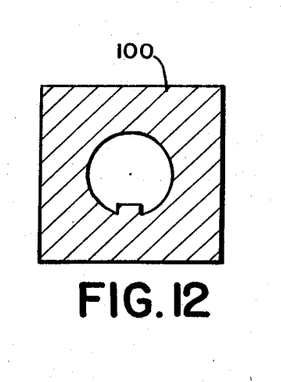

As noted above, the seal is an integral part of an incline padded catching surface for shake-catch harvesters and must operate effectively for maximum efficiency. On our shake-catch harvester, incline catching surface 2 which consists of a neoprene-on-nylon sheet supported by tubular steel frame 84, FIGS. 7 and 8, whose side members that may come in contact with the tree trunk are covered by a four to six inch wide foam buffer 86 that acts as part of a catching surface and provides a safety edge in positioning the catching surface under a tree canopy. The neoprene-on-nylon sheet portion of surface 2 is covered with an energy absorbing foam to catch the falling fruit. Another neoprene-on-nylon sheet can be used to cover and prevent damage to the foam by tree limbs. A teflon coated belting material 88 that overlaps the foam buffers of the catching surface that may contact a tree is sewn or otherwise attached perpendicular to the plane of the catching surface sheet and to a smaller sheet (not shown) below the catching surface and all three components form a pocket that is slipped over the foam buffers and tubular steel frame to hold catching surface 2 in place. Teflon belt 88 also provides a low friction surface for a tree trunk to slide against if contact is made. The upper edge of catching surface 2 is connected to slide bearing 5 by way of elastic bands 3 and eyebolts 9. When the shaker is retracted from the tree the catching surface is slack and when the shaker is extended the elastic bands are tightened and the catching surface is pulled taut. The apparatus is also provided with stationary catching surface 91 to prevent fruit from being lost in the space between surface 2 and track 7. At the opening 90 provided in the catching surface to accommodate a tree trunk the neoprene-on-nylon material also forms a flexible, movable flap 92 over the area into which a tree trunk is positioned during the shaking operation. Each side of the opening including the edge of the flexible flap is provided with foam edge covered with the teflon coated belting material. The inside edge of this flap is fastened to elastic band 93 which has one end fastened to block 94, FIG. 9, which is secured to steel rod 96. The other end of elastic band 93 is fastened to tubular steel frame 84. Rod 96 is sequenced by hydraulic cylinder 98 and is prevented from rotating by guide block 100 that is an integral part of the support frame 84. In the open position the flap and rod are in such a position as to allow the tree trunk to be freely positioned within the catching surface framework. At this point in harvesting, the jaws of a trunk shaker, positioned under the catching surface, are clamped firmly onto the tree trunk. By plumbing sequencing cylinder 98 in parallel with clamping cylinder 42, steel rod 96 is activated to the closed position and positions flap 92 to form a seal around the tree trunk and an effective catching surface. The foam along the edge of the opening opposite the flexible flap deforms to allow space for the trunk. Steel rod 96 has keyway 104 cut along its length that prevents it from rotating when operating in guide block 100, FIGS. 11 and 12. This prevents the end block from rotating and causing the flap and support members to become slack. A double closing trunk seal can be made by using a double instead of a single flap and adding a second end block, rod and sequencing cylinder to close and open the second flap. In a schematic, the two flaps and accompanying end block rod and cylinder would appear as mirror images of each other.

I claim:

1. An apparatus for preventing damage to a tree during retraction from the trunk of the tree of the shaker mechanism of a continuously moving shake-catch harvester, comprising
   (a) a main track system on which the shaker mechanism operates;
   (b) a trunk release track attached to said shaker mechanism;
   (c) a bearing plate with slide bearings for movement on the trunk release track;
   (d) a release rod for positioning the bearing plate on the trunk release track, said release rod being attached to the bearing plate and to a movable member of the shaker mechanism;
   (e) a connecting plate pivotally attached to the bearing plate for clockwise rotation; and
   (f) an angle iron pivotally attached to the main track system, said angle iron being provided with equally spaced tabs for engagement with the aforesaid connecting plate.

2. The apparatus of claim 1 wherein the connecting plate is provided with means for holding it in a position perpendicular to the trunk release track.

3. The apparatus of claim 1 wherein the angle iron is provided with pivot means for engaging the tabs with the connecting plate.

4. The apparatus of claim 1 including a means of disengaging the connecting plate from the tabs of the angle iron.

5. The apparatus of claim 2 wherein said means comprises a tilt bracket.

6. The apparatus of claim 1 into which is incorporated a means for preventing the shaker mechanism from sliding rearward when the harvester is proceeding uphill.

7. The apparatus of claim 6, wherein the means for preventing the shaker mechanism of a continuous shake-catch harvester from sliding rearward when the harvester is proceeding uphill, comprises:
   (a) a plate connected to the shaker mechanism and movably positioned over the main track;
   (b) a rod attached to and vertically oriented to the plane of the main track;
   (c) a bar for butting against the rear of the plate when the shaker is in retracted position, said bar having an opening to fit over the rod, and said bar having spring and cable means for partial clockwise rotation; and
   (d) a stop attached to the main track for limiting clockwise rotation of the bar.

8. The apparatus of claim 1 having means for providing a seal on the catching surface of a shake-catch harvester having a shaker mechanism with hydraulic cylinder operated shaker jaws.

9. The Apparatus of claim 8 wherein the means for providing a seal on the catching surface of a shake-catch harvester having a shaker mechanism with hydraulic cylinder operated shaker jaws, comprises:
   (a) a flexible, opening flap to allow the catching surface to accommodate a tree trunk;
   (b) an end block fastened to the outside corner of said flap;
   (c) a rod provided with guiding means attached to the end block; and
   (d) a hydraulic cylinder attached to the rod and to a frame member of the catching surface, said cylinder being sequenced to operate in parallel with a cylinder that operates the jaws of the shaker mechanism of the aforesaid shake-catch harvester.

10. The apparatus of claim 1 into which is incorporated an energy absorbing fruit catching surface to reduce rebound energy and minimize damage to the fruit.

11. The apparatus of claim 10 wherein the energy absorbing fruit catching surface comprises:
    (a) a frame,
    (b) a neoprene-on-nylon sheet covered with foam and supported by the frame,
    (c) a track connected to the harvester frame, said track having means to accommodate slide bearing, and
    (d) an elastic band connected to both the catching surface and the slide bearing, said band providing tension to the catching surface thereby reducing rebound energy.

* * * * *